US008801110B2

(12) United States Patent
Hatano et al.

(10) Patent No.: US 8,801,110 B2
(45) Date of Patent: Aug. 12, 2014

(54) VEHICLE BRAKE DEVICE

(75) Inventors: Kunimichi Hatano, Wako (JP); Naoto Ohkubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 13/146,974

(22) PCT Filed: Feb. 9, 2010

(86) PCT No.: PCT/JP2010/051848
§ 371 (c)(1),
(2), (4) Date: Jul. 29, 2011

(87) PCT Pub. No.: WO2010/092939
PCT Pub. Date: Aug. 19, 2010

(65) Prior Publication Data
US 2011/0285200 A1 Nov. 24, 2011

(30) Foreign Application Priority Data
Feb. 13, 2009 (JP) ................................ 2009-031251

(51) Int. Cl.
*B60T 13/00* (2006.01)
(52) U.S. Cl.
USPC ............ 303/6.01; 303/11; 303/15; 303/115.1
(58) Field of Classification Search
USPC ................. 303/10, 11, 15, 122.04, 116.1, 20, 303/116.4, 122.1, 116.2, 115.1, 115.2, 6.01
See application file for complete search history.

(56) References Cited

U.S. PATENT DOCUMENTS

| 2006/0055233 | A1* | 3/2006 | Ohishi et al. ............... 303/11 |
| 2008/0290726 | A1* | 11/2008 | Inoue et al. ............... 303/15 |
| 2011/0316328 | A1* | 12/2011 | Hatano ............... 303/10 |

FOREIGN PATENT DOCUMENTS

| DE | 4446525 | 6/1996 |
| DE | 102007026183 | 12/2007 |
| EP | 1970271 | 9/2008 |
| JP | 2002-200973 | 7/2002 |
| JP | 2003-312463 | 11/2003 |
| JP | 2007-326395 | 12/2007 |
| JP | 2008-221995 | 9/2008 |

OTHER PUBLICATIONS

German Office Action dated Mar. 28, 2014, 8 pages.

* cited by examiner

*Primary Examiner* — Melanie Torres Williams
(74) *Attorney, Agent, or Firm* — Rankin, Hill & Clark LLP

(57) ABSTRACT

When brake fluid of a first wheel cylinder (39a) of a slave cylinder (23) is increased by supplying the brake fluid to a first wheel cylinder (16, 17) by a first pump (64A), a second piston (38B), which is a free piston, of the slave cylinder (23) moves toward the first fluid pressure chamber (39A) side, the volume of a second fluid pressure chamber (39B) thereby expands, and the brake fluid pressure of a second wheel cylinder (20, 21) can be reduced, whereas when brake fluid pressure of the second fluid pressure chamber (39B) is increased by supplying the brake fluid to the second wheel cylinder (20, 21) by a second pump (64B), the second piston (38B) moves toward the second fluid pressure chamber (39B) side, the volume of the first fluid pressure chamber (39A) thereby expands, and the brake fluid pressure of the first wheel cylinder (16, 17) can be reduced, thus enabling a difference in brake fluid pressure to be freely generated between the first and second wheel cylinders (16, 17).

6 Claims, 5 Drawing Sheets

VEHICLE BRAKE DEVICE

TECHNICAL FIELD

The present invention relates to a vehicle brake device in which a first piston that is directly operated by a drive source and a second piston that is a free piston operated indirectly in response to operation of the first piston are disposed in tandem within a cylinder main body, a first fluid pressure chamber formed between the first piston and the second piston is connected to a first wheel cylinder of one of a front wheel and a rear wheel, and a second fluid pressure chamber formed between the second piston and the cylinder main body is connected to a second wheel cylinder of the other of the front wheel and the rear wheel.

BACKGROUND ART

An arrangement in which a so-called BBW (brake-by-wire) type brake device, in which a driver's braking operation is converted into an electrical signal so as to operate a slave cylinder and a wheel cylinder is operated by a brake fluid pressure generated by this slave cylinder, is combined with an ABS (antilock brake system) system that suppresses locking of a wheel so as to shorten the braking distance is known from Patent Document 1 below.

Patent Document 1: Japanese Patent Application Laid-open No. 2007-326395

DISCLOSURE OF INVENTION

Problems to be Solved by the Invention

Meanwhile, a conventional slave cylinder is formed as a tandem system equipped with two pistons, and the brake fluid pressure generated thereby is supplied to a diagonally positioned system of a left front wheel and right rear wheel and a diagonally positioned system of a right front wheel and left rear wheel. In a hybrid automobile or an electric automobile, in which left and right front wheels or left and right rear wheels are connected to a motor/generator, when carrying out motor/generator regenerative braking it is necessary to reduce the brake fluid pressure for a wheel connected to the motor/generator and replace it with the regenerative braking, but since a conventional slave cylinder cannot reduce only the brake fluid pressure for a front wheel or reduce only the brake fluid pressure for a rear wheel, it is difficult to efficiently carry out motor/generator regenerative braking while ensuring the total braking force for the vehicle.

The present invention has been accomplished in light of the above-mentioned circumstances, and it is an object thereof to enable the brake fluid pressure of a front wheel system and the brake fluid pressure of a rear wheel system to be independently controlled in a brake device that can generate brake fluid pressures for two systems.

Means for Solving the Problems

In order to attain the above object, according to a first aspect of the present invention, there is proposed a vehicle brake device in which a first piston that is operated directly by a drive source and a second piston that is a free piston operated indirectly in response to operation of the first piston are disposed in tandem within a cylinder main body, a first fluid pressure chamber formed between the first piston and the second piston is connected to first wheel cylinders of front-side left and right wheels or rear-side left and right wheels, and a second fluid pressure chamber formed between the second piston and the cylinder main body is connected to second wheel cylinders of left and right wheels on a side different from the first wheel cylinders, characterized in that the vehicle brake device comprises: a first pump supplying brake fluid of the first fluid pressure chamber to the first wheel cylinders; and a second pump supplying brake fluid of the second fluid pressure chamber to the second wheel cylinders.

Furthermore, according to a second aspect of the present invention, in addition to the first aspect, there is proposed the vehicle brake device, wherein the front wheels or the rear wheels are connected to a motor/generator.

Moreover, according to a third aspect of the present invention, in addition to the first aspect, there is proposed the vehicle brake device, wherein the device comprises a first electromagnetic valve controlling the state of communication between a suction side of the first pump and the first fluid pressure chamber, a second electromagnetic valve controlling the state of communication between a discharge side of the first pump and the first fluid pressure chamber, a third electromagnetic valve controlling the state of communication between a suction side of the second pump and the second fluid pressure chamber, and a fourth electromagnetic valve controlling the state of communication between a discharge side of the second pump and the second fluid pressure chamber.

Furthermore, according to a fourth aspect of the present invention, in addition to the third aspect, there is proposed the vehicle brake device, wherein the second electromagnetic valve and the fourth electromagnetic valve have a variable degree of opening.

Moreover, according to a fifth aspect of the present invention, in addition to the first aspect, there is proposed the vehicle brake device, wherein the front wheels and the rear wheels are connected to a motor/generator.

Furthermore, according to a sixth aspect of the present invention, there is proposed a method for controlling a vehicle brake device in which a first piston that is operated directly by a drive source and a second piston that is a free piston operated indirectly in response to operation of the first piston are disposed in tandem within a cylinder main body, a first fluid pressure chamber formed between the first piston and the second piston is connected to first wheel cylinders of front side left and right wheels or rear side left and right wheels, and a second fluid pressure chamber formed between the second piston and the cylinder main body is connected to second wheel cylinders of left and right wheels on a side different from the first wheel cylinders, the vehicle brake device comprising control means for controlling the drive source, a first pump supplying brake fluid of the first fluid pressure chamber to the first wheel cylinders, and a second pump supplying brake fluid of the second fluid pressure chamber to the second wheel cylinders, wherein the method comprises: a step of determining a brake fluid pressure that is to be generated in the first wheel cylinders and the second wheel cylinders; a step of driving the drive source by determining the amount that the drive source is to be operated based on the brake fluid pressure; and a step of generating a pressure difference between the first fluid pressure chamber and the second fluid pressure chamber by driving the first pump or the second pump.

Here, wheel cylinders 16 and 17 of an embodiment correspond to the first wheel cylinder of the present invention, wheel cylinders 20 and 21 of the embodiment correspond to the second wheel cylinder of the present invention, an electric motor 32 of the embodiment corresponds to the drive source of the present invention, a rear piston 38A and a front piston 38B of the embodiment correspond to the first piston and the second piston of the present invention respectively, a rear fluid pressure chamber 39A and a front fluid pressure chamber 39B of the embodiment correspond to the first fluid pressure chamber and the second fluid pressure chamber of the present invention respectively, a suction valve 66 of the embodiment corresponds to the first and third electromagnetic valves of the present invention, and a regulator valve 54 of the embodiment corresponds to the second and fourth electromagnetic valves of the present invention.

Effects of the Invention

In accordance with the first aspect of the present invention, since the first piston that is directly operated by the drive source and the second piston that is a free piston operated indirectly in response to operation of the first piston are disposed in tandem within the cylinder main body, the first fluid pressure chamber between the first and second pistons is connected to a first wheel cylinder of one of the front-side left and right wheels or the rear-side left and right wheels, and the second fluid pressure chamber between the second piston and the cylinder main body is connected to a second wheel cylinder of the left and right wheels on a side different from the first wheel cylinder, when the first piston is driven directly by the drive source, the second piston is also driven indirectly, a brake fluid pressure is generated in the first and second fluid pressure chambers, and the first and second wheel cylinders can be operated.

When the brake fluid pressure of the first wheel cylinder is increased by supplying the brake fluid of the first fluid pressure chamber to the first wheel cylinder by the first pump, the second piston, which is a free piston, moves toward the first fluid pressure chamber side, the volume of the second fluid pressure chamber thereby expands, and the brake fluid pressure of the second wheel cylinder can be reduced, whereas when the brake fluid pressure of the second wheel cylinder is increased by supplying the brake fluid of the second fluid pressure chamber to the second wheel cylinder by the second pump, the second piston, which is a free piston, moves toward the second fluid pressure chamber side, the volume of the first fluid pressure chamber thereby expands, and the brake fluid pressure of the first wheel cylinder can be reduced, thus enabling a difference in brake fluid pressure to be freely generated between the first and second wheel cylinders.

Furthermore, in accordance with the second aspect of the present invention, since the front wheel or the rear wheel is connected to the motor/generator, when regenerative braking by the motor/generator is carried out, reducing only the brake fluid pressure of the wheel cylinder of the wheel connected to the motor/generator enables the efficiency of recovery of energy by regenerative braking to be maximized while ensuring the total braking force for the vehicle.

Moreover, in accordance with the third aspect of the present invention, since there are provided the first electromagnetic valve controlling the state of communication between the suction side of the first pump and the first fluid pressure chamber, the second electromagnetic valve controlling the state of communication between the discharge side of the first pump and the first fluid pressure chamber, the third electromagnetic valve controlling the state of communication between the suction side of the second pump and the second fluid pressure chamber, and the fourth electromagnetic valve controlling the state of communication between the discharge side of the second pump and the second fluid pressure chamber, closing the first electromagnetic valve and the fourth electromagnetic valve and driving the second pump enables the brake fluid pressure of the second wheel cylinder to be increased and the brake fluid pressure of the first wheel cylinder to be decreased, and closing the third electromagnetic valve and the second electromagnetic valve and driving the first pump enables the brake fluid pressure of the first wheel cylinder to be increased and the brake fluid pressure of the second wheel cylinder to be decreased.

Furthermore, in accordance with the fourth aspect of the present invention, since the second electromagnetic valve and the fourth electromagnetic valve have a variable degree of opening, adjusting the degree of opening of the second and fourth electromagnetic valves enables the amount of pressure increase to be freely controlled when increasing the pressure of the first and second wheel cylinders.

Moreover, in accordance with the fifth aspect of the present invention, since the front wheel and the rear wheel are connected to the motor/generator, when carrying out regenerative braking by the motor/generator, reducing the brake fluid pressure of the wheel cylinders of both the front wheel and the rear wheel connected to the motor/generator enables the efficiency of recovery of energy by regenerative braking to be further enhanced while ensuring the total braking force for the vehicle.

Furthermore, in accordance with the sixth aspect of the present invention, in addition to the operational effects given by the first aspect, since a brake fluid pressure that is to be generated by the first wheel cylinder and the second wheel cylinder is firstly determined, the amount that the drive source of the slave cylinder is operated is subsequently determined based on the brake fluid pressure and the drive source is driven, and the first pump or the second pump is subsequently driven so as to generate a pressure difference between the first fluid pressure chamber and the second fluid pressure chamber of the slave cylinder, it is possible to freely generate a pressure difference in the brake fluid pressure of the first and second wheel cylinders with good precision.

EXPLANATION OF REFERENCE NUMERALS AND SYMBOLS

16 Wheel cylinder (first wheel cylinder)
17 Wheel cylinder (first wheel cylinder)
20 Wheel cylinder (second wheel cylinder)
21 Wheel cylinder (second wheel cylinder)
32 Electric motor (drive source)
36 Cylinder main body
38A Rear piston (first piston)
38B Front piston (second piston)
39A Rear fluid pressure chamber (first fluid pressure chamber)

39B Front fluid pressure chamber (second fluid pressure chamber)
54 Regulator valve (second, fourth electromagnetic valve)
64A First pump
64B Second pump
66 Suction valve (first, third electromagnetic valve)

BEST MODE FOR CARRYING OUT THE INVENTION

A mode for carrying out the present invention is explained below by reference to FIG. 1 to FIG. 4.

Figure 1:
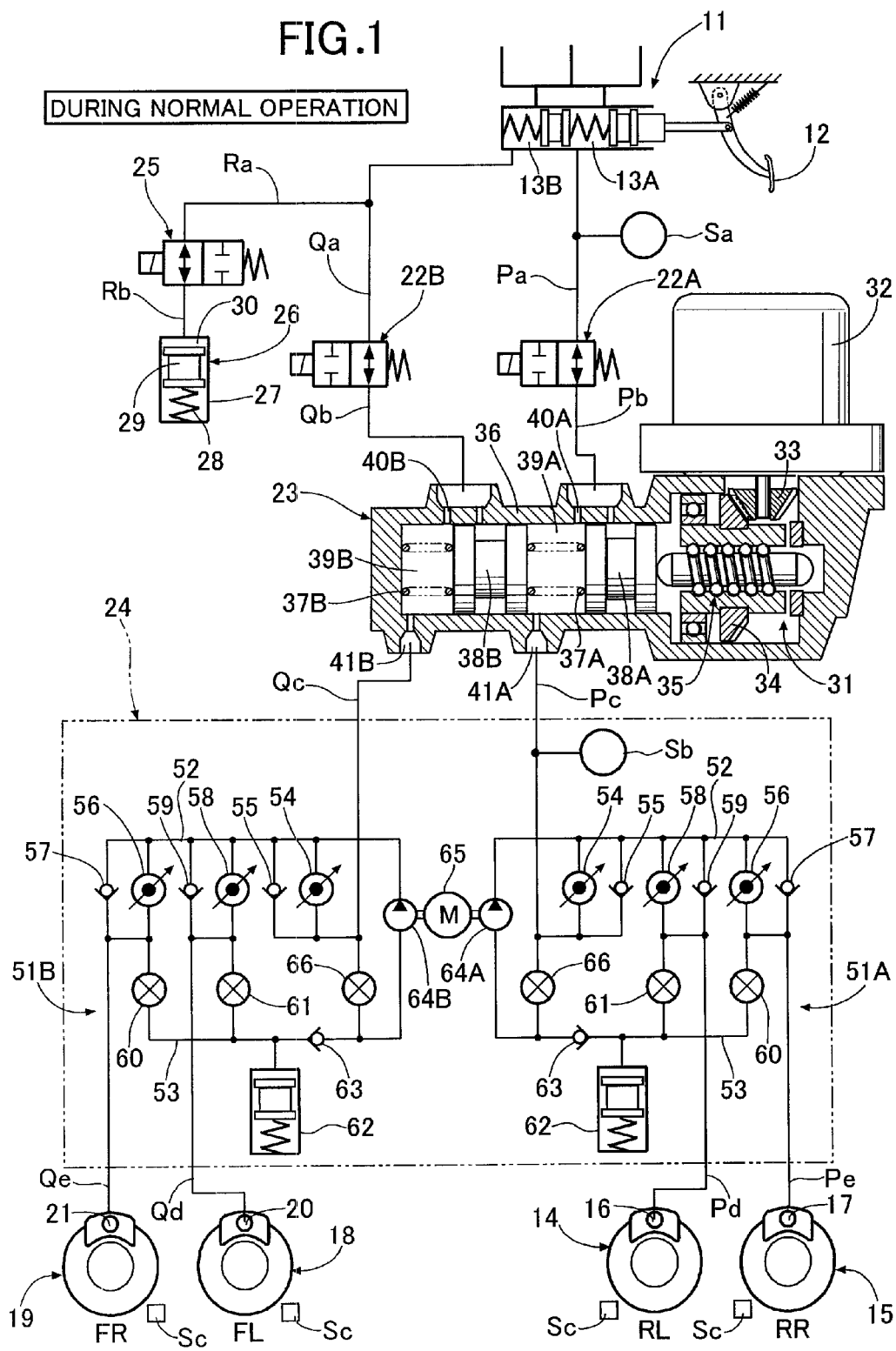
FIG. 1 is a diagram showing a fluid pressure circuit of a brake device during normal operation.

As shown in FIG. 1, a tandem master cylinder 11 includes two fluid pressure chambers 13A and 13B that output a brake fluid pressure corresponding to a depressing force from a driver depressing a brake pedal 12, one fluid pressure chamber 13A is connected to wheel cylinders 16 and 17 of disk brake devices 14 and 15 of a left rear wheel and a right rear wheel via fluid paths Pa, Pb, Pc, Pd, and Pe (rear wheel system), and the other fluid pressure chamber 13B is connected to wheel cylinders 20 and 21 of disk brake devices 18 and 19 of a left front wheel and a right front wheel via fluid paths Qa, Qb, Qc, Qd, and Qe (front wheel system).

A cut-off valve 22A, which is a normally open electromagnetic valve, is disposed between the fluid paths Pa and Pb, a cut-off valve 22B, which is a normally open electromagnetic valve, is disposed between the fluid paths Qa and Qb, a slave cylinder 23 is disposed between the fluid paths Pb and Qb and the fluid paths Pc and Qc, and a VSA (vehicle stability assist) device 24 is disposed between the fluid paths Pc and Qc and the fluid paths Pd and Pe; Qd and Qe.

A stroke simulator 26 is connected to fluid paths Ra and Rb branching from the fluid path Qa via a reaction force allowing valve 25, which is a normally closed electromagnetic valve. The stroke simulator 26 is one in which a piston 29 urged by means of a spring 28 is slidably fitted into a cylinder 27, and a fluid pressure chamber 30 formed on the opposite side of the piston 29 to the spring 28 communicates with the fluid path Rb.

An actuator 31 of the slave cylinder 23 includes an electric motor 32, a drive bevel gear 33 provided on an output shaft thereof, a driven bevel gear 34 meshing with the drive bevel gear 33, and a ball screw mechanism 35 that is operated by the driven bevel gear 34.

A rear piston 38A and a front piston 38B urged in the backward direction by return springs 37A and 37B respectively are slidably disposed in a rear part and a front part of a cylinder main body 36 of the slave cylinder 23, and a rear fluid pressure chamber 39A and a front fluid pressure chamber 39B are defined in front of the rear piston 38A and the front piston 38B respectively.

The rear fluid pressure chamber 39A communicates with the fluid path Pb via a rear input port 40A and communicates with the fluid path Pc via a rear output port 41A, and the front fluid pressure chamber 39B communicates with the fluid path Qb via a front input port 40B and communicates with the fluid path Qc via a front output port 41B.

The front piston 38B, which is sandwiched between the pair of return springs 37A and 37B, is a free piston that can freely move in the fore-and-aft direction.

In FIG. 1, when the electric motor 32 is driven in one direction, the rear and front pistons 38A and 38B are moved forward via the drive bevel gear 33, the driven bevel gear 34, and the ball screw mechanism 35, and at the moment when the rear and front input ports 40A and 40B communicating with the fluid paths Pb and Qb are closed a brake fluid pressure is generated in the rear and front fluid pressure chambers 39A and 39B, thus enabling the brake fluid pressure to be outputted to the fluid paths Pc and Qc via the rear and front output ports 41A and 41B.

The structure of the VSA device 24 is known and employs the same structure for a first brake actuator 51A for controlling the rear wheel system of the disk brake devices 14 and 15 for the left rear wheel and the right rear wheel and for a second brake actuator 51B for controlling the front wheel system of the disk brake devices 18 and 19 for the left front wheel and the right front wheel.

The first brake actuator 51A for the rear wheel system of the disk brake devices 14 and 15 for the left rear wheel and the right rear wheel is explained below as being representative thereof.

The first brake actuator 51A is disposed between the fluid path Pc communicating with the rear output port 41A of the slave cylinder 23 positioned on the upstream side and the fluid paths Pd and Pe communicating respectively with the wheel cylinders 16 and 17 of the left rear wheel and the right rear wheel positioned on the downstream side.

The first brake actuator 51A includes a fluid path 52 and a fluid path 53 in common for the wheel cylinders 16 and 17 of the left rear wheel and the right rear wheel, and includes a regulator valve 54, which is a normally open electromagnetic valve with a variable degree of opening, disposed between the fluid path Pc and the fluid path 52, a check valve 55 disposed in parallel to the regulator valve 54 and allowing flow of brake fluid from the fluid path Pc side to the fluid path 52 side, an in-valve 56, which is a normally open electromagnetic valve with a variable degree of opening, disposed between the fluid path 52 and the fluid path Pe, a check valve 57 disposed in parallel to the in-valve 56 and allowing flow of brake fluid from the fluid path Pe side to the fluid path 52 side, an in-valve 58, which is a normally open electromagnetic valve with a variable degree of opening, disposed between the fluid path 52 and the fluid path Pd, a check valve 59 disposed in parallel to the in-valve 58 and allowing flow of brake fluid from the fluid path Pd side to the fluid path 52 side, an out-valve 60, which is a normally closed electromagnetic valve, disposed between the fluid path Pe and the fluid path 53, an out-valve 61, which is a normally closed electromagnetic valve, disposed between the fluid path Pd and the fluid path 53, a reservoir 62 connected to the fluid path 53, a check valve 63 disposed between the fluid path 53 and the fluid path 52 and allowing flow of brake fluid from the fluid path 53 side to the fluid path 52 side, a first pump 64A disposed between the check valve 63 and the fluid path 52 and supplying brake fluid from the fluid path 53 side to the fluid path 52 side, an electric motor 65 for driving the first pump 64A, and a suction valve 66, which is a normally closed electromagnetic valve, disposed between the fluid path Pc and a position between the check valve 63 and the first pump 64A.

The electric motor 65 is shared by the first and second pumps 64A and 64B of the first and second brake actuators 51A and 51B, but by closing one of the two suction valves 66 and 66 one of the first and second pumps 64A and 64B can be made substantially inoperative. It is also possible to provide electric motors 65 and 65 that are exclusively used for the first and second pumps 64A and 64B respectively A fluid pressure sensor Sa for detecting a brake fluid pressure is provided in the fluid path Pa extending from one fluid pressure chamber 13A of the master cylinder 11, a fluid pressure sensor Sb for detecting a brake fluid pressure generated by the slave cylinder 23 is provided in the fluid path Pc on one entrance side of the VSA device 24, and wheel speed sensors Sc are provided on the four wheels respectively.

An electronic control unit (not illustrated) to which signals from the fluid pressure sensors Sa and Sb and the wheel speed sensors Sc are inputted controls the operation of the cut-off valves 22A and 22B, the VSA device 24, the reaction force allowing valve 25, and the slave cylinder 23.

The vehicle equipped with the brake device having the above-mentioned arrangement is a hybrid automobile; the left and right front wheels are driven by an engine, and the left and right rear wheels are driven by a motor/generator.

Next, the operation of the first embodiment of the present invention having the above-mentioned arrangement is explained.

The operation when regenerative braking of the left and right rear wheels driven by the motor/generator is not carried out is first explained.

When the situation is normal and the system functions normally, as shown in FIG. 1 the cut-off valves 22A and 22B, which are normally open electromagnetic valves, are de-energized and opened, and the reaction force allowing valve 25, which is a normally closed electromagnetic valve, is energized and opened. In this state, if the fluid pressure sensor Sa provided in the fluid path Pa detects depression of the brake pedal 12 by the driver, the electric motor 32 of the slave cylinder 23 actuates, the rear and front pistons 38A and 38B move forward, and a brake fluid pressure is therefore generated in the rear and front fluid pressure chambers 39A and 39B. This brake fluid pressure is transmitted to the wheel cylinders 16 and 17; 20 and 21 of the disk brake devices 14 and 15; 18 and 19 via the opened in-valves 56 and 56; 58 and 58 of the VSA device 24, thus braking the wheels.

If the rear and front pistons 38A and 38B of the slave cylinder 23 move slightly forward, since communication between the fluid paths Pb and Qb and the rear and front fluid pressure chambers 39A and 39B is cut off, a brake fluid pressure generated by the master cylinder 11 is not transmitted to the disk brake devices 14 and 15; 18 and 19. In this process, a brake fluid pressure generated by the fluid pressure chamber 13B of the master cylinder 11 is transmitted to the fluid pressure chamber 30 of the stroke simulator 26 via the opened reaction force allowing valve 25, and moving the piston 29 against the spring 28 permits stroke of the brake pedal 12 and generates a simulated pedal reaction force, thus eliminating any disagreeable sensation for the driver.

Controlling the operation of the slave cylinder 23 so that the brake fluid pressure detected by the fluid pressure sensor Sb provided in the fluid path Pc attains a value that is commensurate with the brake fluid pressure detected by the fluid pressure sensor Sa provided in the fluid path Pa enables a braking force that is commensurate with the depressing force applied to the brake pedal 12 by the driver to be generated in the wheel cylinders 16 and 17; 20 and 21.

Next, the operation of the VSA device 24 is explained.

When the driver depresses the brake pedal 12 in order to carry out braking, the electric motor 65 stops operating, the regulator valves 54 and 54 are de-energized and opened, the suction valves 66 and 66 are de-energized and closed, the in-valves 56 and 56; 58 and 58 are de-energized and opened, and the out-valves 60 and 60; 61 and 61 are de-energized and closed. Therefore, a brake fluid pressure outputted from the rear and front output ports 41A and 41B of the operating slave cylinder 23 is supplied from the regulator valves 54 and 54 to the wheel cylinders 16 and 17; 20 and 21 via the opened in-valves 56 and 56; 58 and 58, thus braking the four wheels.

When the driver is not depressing the brake pedal 12, driving the first and second pumps 64A and 64B by means of the electric motor 65 in a state in which the suction valves 66 and 66 are energized and opened allows brake fluid that has been sucked from the slave cylinder 23 side via the suction valves 66 and 66 and pressurized by the first and second pumps 64A and 64B to be supplied to the regulator valves 54 and 54 and the in-valves 56 and 56; 58 and 58. Therefore, regulating the degree of opening by energizing the regulator valves 54 and 54 so as to adjust the brake fluid pressure in the fluid paths 52 and 52 and supplying the brake fluid pressure selectively to the wheel cylinders 16 and 17; 20 and 21 via the in-valves 56 and 56; 58 and 58 that are opened at a predetermined degree of opening by energization enables the braking forces for the four wheels to be individually controlled even in a state in which the driver is not depressing the brake pedal 12.

It is therefore possible to individually control the braking forces for the four wheels by means of the first and second brake actuators 51A and 51B, enhance the turning performance by increasing the braking force for the turning inner wheel, and enhance straight-line stability by increasing the braking force for the turning outer wheel.

Furthermore, when the driver rapidly depresses the brake pedal 12 in order to avoid a collision, the brake fluid pressure generated by the slave cylinder 23 is further increased by the first and second pumps 64A and 64B, and the increased brake fluid pressure generates the maximum braking force in the wheel cylinders 16 and 17; 20 and 21. That is, if the first and second pumps 64A and 64B are driven by the electric motor 65 in a state in which the regulator valves 54 and 54 are energized and closed and the suction valves 66 and 66 are energized and opened, the brake fluid pressure generated by the slave cylinder 23 is sucked by the first and second pumps 64A and 64B via the suction valves 66 and 66, further pressurized there, and supplied to the wheel cylinders 16 and 17; 20 and 21 via the in-valves 56 and 56; 58 and 58, thus generating a large braking force for assisting the braking operation by the driver and avoiding a collision.

Furthermore, for example, when a tendency for the left rear wheel running on a road with a low coefficient of friction to lock is detected based on output of the wheel speed sensors Sc during braking by the driver depressing the brake pedal 12, after the brake fluid pressure of the wheel cylinder 16 for the left rear wheel is released to the reservoir 62 so as to reduce it to a predetermined pressure by energizing and closing one in-valve 58 of the first brake actuator 51A and energizing and opening one out-valve 61, the brake fluid pressure of the wheel cylinder 16 for the left rear wheel is held by de-energizing and closing the out-valve 61. If, as a result, the locking tendency of the wheel cylinder 16 for the left rear wheel starts to disappear, de-energizing and opening the in-valve 58 allows brake fluid pressure from the rear output port 41A of the slave cylinder 23 to be supplied to the wheel cylinder 16 for the left rear wheel so that it increases to a predetermined pressure, thus increasing the braking force.

When this increase in pressure causes the left rear wheel to have a locking tendency again, repeating said pressure reducing→holding→pressure increasing enables ABS (Antilock Brake System) control for minimizing the braking distance to be carried out while suppressing locking of the left rear wheel.

ABS control when the wheel cylinder 16 for the left rear wheel has a tendency to lock is explained above, and ABS control can be carried out in the same manner when the wheel cylinder 17 for the right rear wheel, the wheel cylinder 20 for the left front wheel, or the wheel cylinder 21 for the right front wheel has a tendency to lock.

While the above-mentioned VSA control (including the ABS control) is being executed, maintaining the cut-off valves 22A and 22B in a valve closed state can prevent a change in fluid pressure due to operation of the VSA device 24 from being transmitted from the master cylinder 11 to the brake pedal 12 as a kickback.

Figure 2:
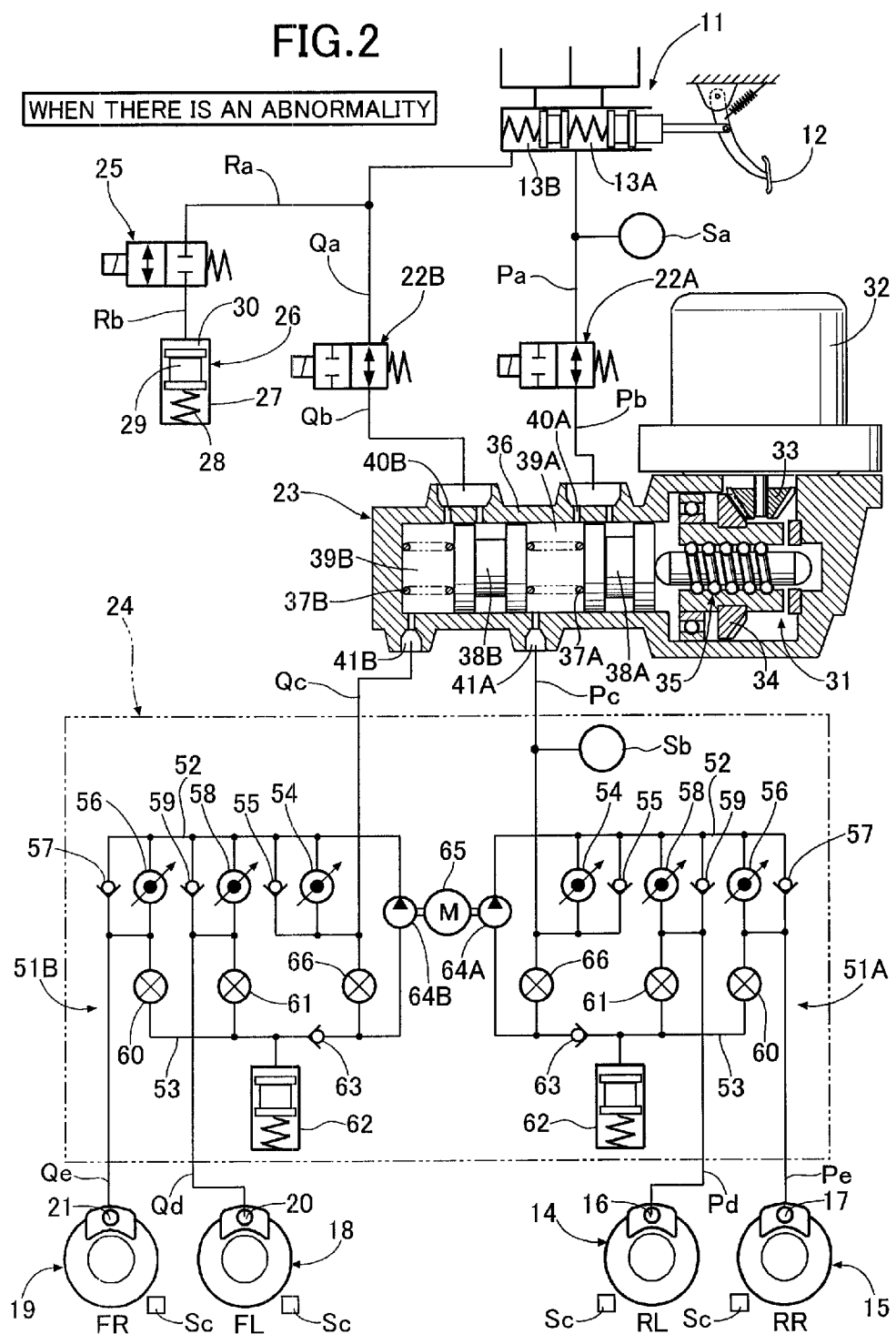
FIG. 2 is a diagram showing a fluid pressure circuit of the brake device when there is an abnormality.

If the power source malfunctions, as shown in FIG. 2, the cut-off valves 22A and 22B, which are normally open electromagnetic valves, automatically open, the reaction force allowing valve 25, which is a normally closed electromagnetic valve, automatically closes, the in-valves 56 and 56; 58 and 58, which are normally open electromagnetic valves, automatically open, and the out-valves 60 and 60; 61 and 61, which are normally closed electromagnetic valves, automatically close. In this state, brake fluid pressure generated in the two fluid pressure chambers 13A and 13B of the master cylinder 11 passes, without being absorbed by the stroke simulator 26, through the cut-off valves 22A and 22B, the rear and front fluid pressure chambers 39A and 39B of the slave cylinder 23, and the in-valves 56 and 56; 58 and 58, thus operating the wheel cylinders 16 and 17; 20 and 21 of the disk brake devices 14 and 15; 18 and 19 of the wheels and generating a braking force without problems.

Next, the operation when regenerative braking of the left and right rear wheels driven by the motor/generator is carried out is explained.

When regeneratively braking the left and right rear wheels connected to the motor/generator, in order to recover the kinetic energy of the vehicle body as electrical energy to the fullest, it is necessary to inhibit or suppress hydraulic braking of the left and right rear wheels. In this process, if the hydraulic braking of the left and right rear wheels is inhibited or suppressed by reducing the amount that the slave cylinder 23 is operated, the brake fluid pressure for the left and right front wheels also decreases, and therefore the total braking force generated for the vehicle is insufficient. In the present embodiment, only the brake fluid pressure for the rear wheels is reduced while maintaining the brake fluid pressure for the front wheels.

Figure 4:
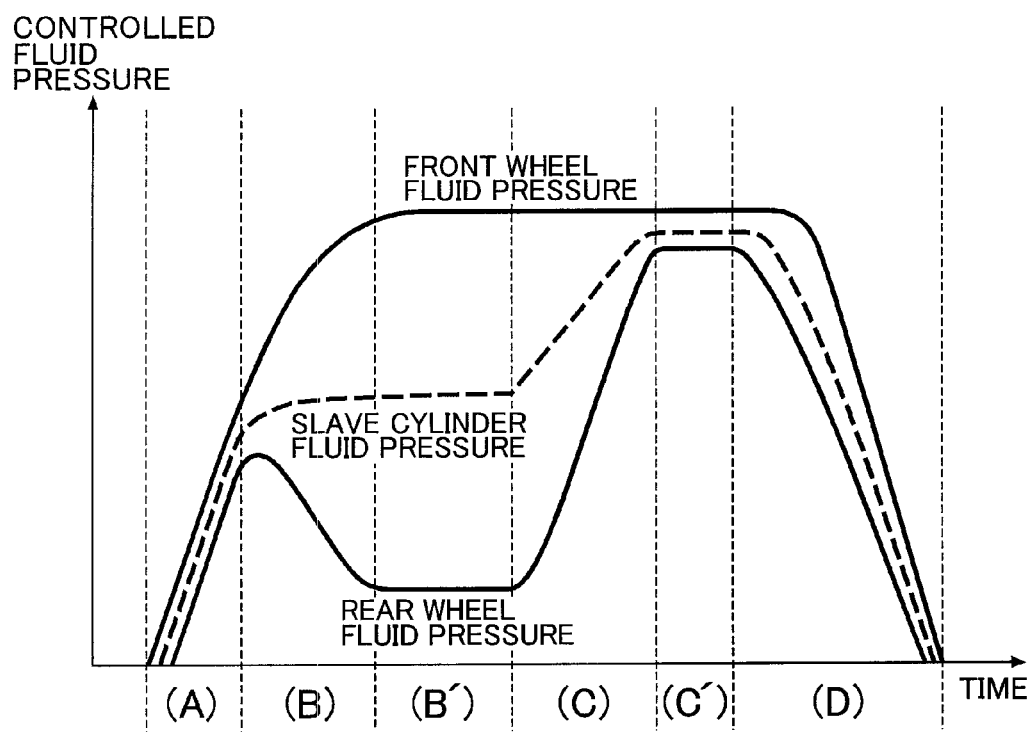
FIG. 4 is a diagram showing change in brake fluid pressure of the front wheel system and the rear wheel system at a time of regenerative braking.

As shown in FIG. 4, in region (A) the same brake fluid pressure is supplied from the slave cylinder 23 to the front wheels and the rear wheels, but in region (B) the brake fluid pressure for the rear wheels is reduced so that the rear wheels are regeneratively braked. In region (B') regenerative braking is in progress, the brake fluid pressure for the rear wheels is maintained at a low value, and in region (C) in order to stop regenerative braking and shift to hydraulic braking, the brake fluid pressure for the rear wheels is increased. In region (C') regenerative braking is ended and the same brake fluid pressure is supplied from the slave cylinder 23 to the front wheels and the rear wheels, and in region (D) in order to end hydraulic braking the brake fluid pressure supplied from the slave cylinder 23 to the front wheels and the rear wheels reduces.

Figure 3:
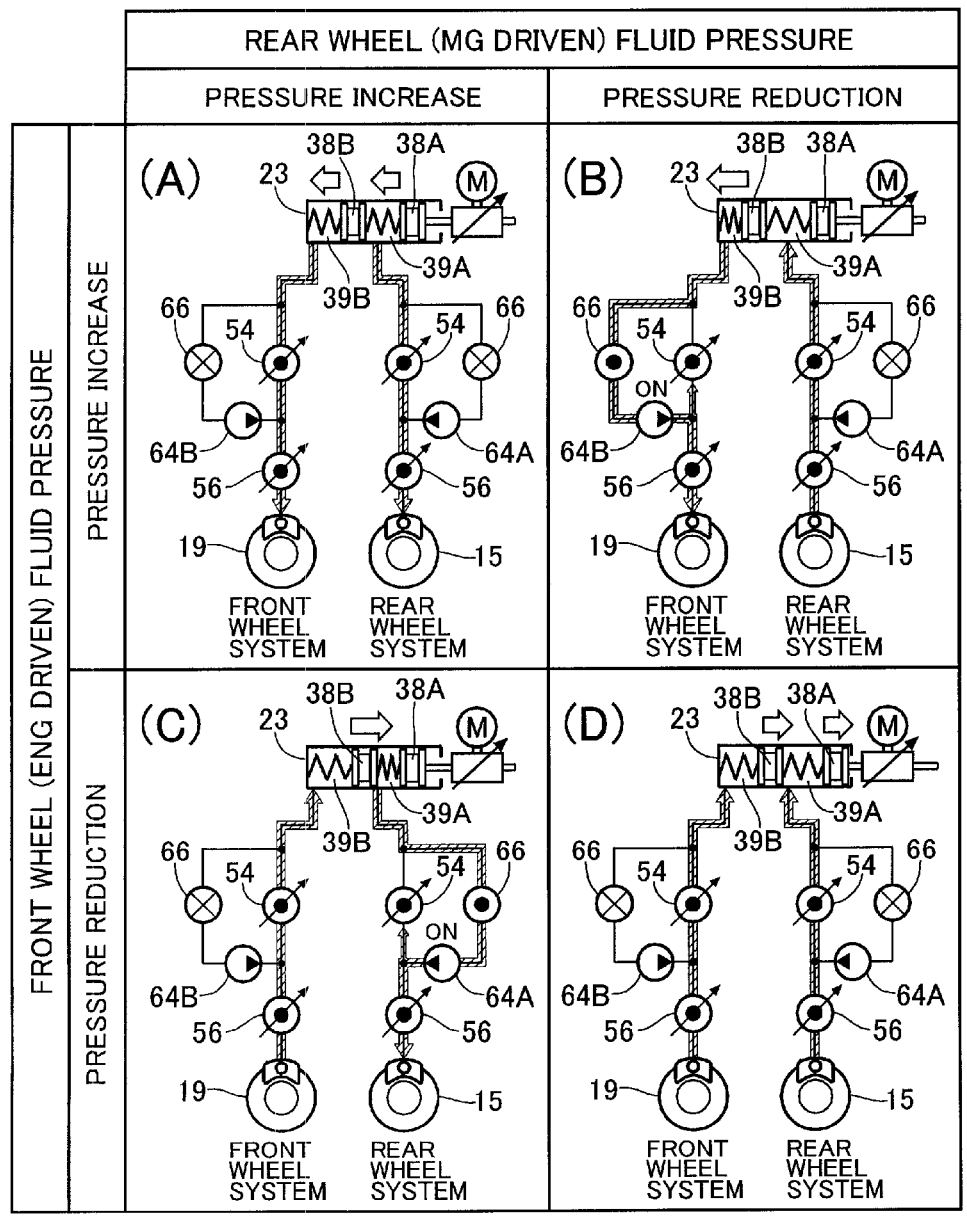
FIG. 3 is a diagram showing an equivalent fluid pressure circuit of a front wheel system and a rear wheel system at a time of regenerative braking.

FIG. 3 shows an equivalent circuit in which parts related to the present control are extracted from the fluid pressure circuit diagram of FIG. 1 and simplified, the fluid pressure circuit for the right front wheel among the left and right front wheels, which are subjected to the same control, and the fluid pressure circuit for the right rear wheel among the left and right rear wheels, which are subjected to the same control, being illustrated.

The operation of regions (A), (B), (C), and (D) is explained below based on FIG. 3.

FIG. 3 (A) shows a region in which the brake fluid pressure of the disk brake device 15 for the rear wheel and the brake fluid pressure of the disk brake device 19 for the front wheel are increased in the same manner by the brake fluid pressure generated by the slave cylinder 23. In this process, for the front wheel system and the rear wheel system, the first and second pumps 64A and 64B are inoperative, the regulator valves 54 are opened, the suction valves 66 are closed, and the in-valves 56 are opened.

Therefore, the brake fluid pressure of the rear wheel system generated in the rear fluid pressure chamber 39A of the slave cylinder 23 passes through the regulator valve 54 and the in-valve 56 and is supplied to the disk brake device 15 of the right rear wheel, and the brake fluid pressure of the front wheel system generated in the front fluid pressure chamber 39B of the slave cylinder 23 passes through the regulator valve 54 and the in-valve 56 and is supplied to the disk brake device 19 of the right front wheel.

FIG. 3 (B) shows a case in which, in order to regeneratively brake the rear wheels, the brake fluid pressure for the front wheel system is increased and at the same time the brake fluid pressure for the rear wheel system is decreased to thus increase the pressure difference, and in this case, in a state in which the slave cylinder 23 is stopped at its current position, the suction valve 66 of the front wheel system is switched from a valve closed state to a valve open state, and the second pump 64B of the front wheel system is driven.

As a result, brake fluid of the front fluid pressure chamber 39B of the slave cylinder 23 passes through the suction valve 66, the second pump 64B, and the in-valve 56 and is supplied to the disk brake device 19 of the right front wheel, and the brake fluid pressure for the right front wheel increases. In this process, surplus brake fluid is returned to the front fluid pressure chamber 39B of the slave cylinder 23 by adjusting the degree of opening of the regulator valve 54.

When brake fluid of the front fluid pressure chamber 39B of the slave cylinder 23 flows out in this way, the front piston 38B, which is a free piston, moves forward to the left side in the figure and the volume of the rear fluid pressure chamber 39A expands, brake fluid of the disk brake device 15 of the right rear wheel therefore passes through the in-valve 56 and the regulator valve 54, is sucked into the rear fluid pressure chamber 39A, and the brake fluid pressure for the right rear wheel decreases.

FIG. 3 (C) is a case in which, in order to end regenerative braking of the rear wheel, while maintaining the brake fluid pressure of the front wheel system, the brake fluid pressure of the rear wheel system is increased so as to decrease the pressure difference; in this case, while driving the slave cylinder 23 in a direction that increases the pressure, the suction valve 66 of the front wheel system is returned from a valve open state to a valve closed state, the suction valve 66 of the rear wheel system is switched from a valve closed state to a valve open state, and the first pump 64A of the rear wheel system is driven.

As a result, brake fluid of the rear fluid pressure chamber 39A of the slave cylinder 23 passes through the suction valve 66, the first pump 64A, and the in-valve 56 and is supplied to the disk brake device 15 of the right rear wheel, and the brake fluid pressure for the right rear wheel increases. In this process, surplus brake fluid is returned to the rear fluid pressure chamber 39A of the slave cylinder 23 by adjusting the degree of opening of the regulator valve 54.

When brake fluid of the rear fluid pressure chamber 39A of the slave cylinder 23 flows out in this way, the front piston 38B, which is a free piston, moves backward to the right side in the figure and the volume of the front fluid pressure chamber 39B expands, brake fluid of the disk brake device 19 of the right front wheel therefore passes through the in-valve 56 and the regulator valve 54 and is sucked into the front fluid pressure chamber 39B, and the brake fluid pressure for the right front wheel reduces.

In this process, since the slave cylinder 23 is driven in a direction that increases the pressure and the rear and front pistons 38A and 38B move forward, the above-mentioned expansion of the volume of the front fluid pressure chamber 39B is counteracted by the slave cylinder 23 being driven in a direction that increases the pressure, the brake fluid pressure for the right front wheel does not reduce but is maintained constant, and only the brake fluid pressure for the right rear wheel is increased (see FIG. 4 (C)).

FIG. 3 (D) is a case in which, in order to end hydraulic braking of the front wheels and the rear wheels, both the brake fluid pressure of the front wheel system and the brake fluid pressure of the rear wheel system are reduced, and in this case, for both the front wheel system and the rear wheel system, the first and second pumps 64A and 64B are inoperative, the regulator valves 54 are opened, the suction valves 66 are closed, the in-valves 56 are opened, and the slave cylinder 23 is then moved backward to the inoperative position.

As a result, the volumes of the rear fluid pressure chamber 39A and the front fluid pressure chamber 39B of the slave cylinder 23 expand, and the brake fluid pressures for the right rear wheel and the right front wheel reduce.

As is clear from FIG. 4, the average value of the brake fluid pressure for the front wheels and the brake fluid pressure for the rear wheels coincides with the brake fluid pressure generated by the slave cylinder 23. That is, in accordance with the present embodiment, while freely determining the brake fluid pressure to be generated by the slave cylinder 23, the brake fluid pressure generated by the slave cylinder 23 is distributed nonuniformly between the rear wheel system and the front wheel system, and a pressure difference can thereby be freely generated between the brake fluid pressures of the rear wheel system and the front wheel system.

Control of the above-mentioned slave cylinder 23 and first and second pumps 64A and 64B is carried out in the procedure below by an electronic control unit as control means.

(1) Detect a brake fluid pressure generated by the master cylinder 11.
(2) Calculate a target braking force (regenerative braking+hydraulic braking force) for the front wheels and the rear wheels from the brake fluid pressure.
(3) Calculate a target brake fluid pressure for the front wheels and a target brake fluid pressure for the rear wheels by subtracting regenerative braking from the target braking force.
(4) Calculate a pressure difference between the target brake fluid pressure for the front wheels and the target brake fluid pressure for the rear wheels.
(5) Calculate the amount of drive required for the slave cylinder 23 from the average value of the target brake fluid pressure for the front wheels and the target brake fluid pressure for the rear wheels, and operate the electric motor 32 of the slave cylinder 23 with the required amount of drive.
(6) Calculate the amounts of drive required for the first and second pumps 64A and 64B from the pressure difference between the target brake fluid pressure for the front wheels and the target brake fluid pressure for the rear wheels, and operate the first and second pumps 64A and 64B with the required amounts of drive.
(7) Drive the electric motor 32 in reverse so as to stop generation of the slave cylinder 23 brake fluid pressure when the master cylinder 11 does not generate a brake fluid pressure.

As hereinbefore described, in accordance with the present embodiment, when regeneratively braking the rear wheels, only the brake fluid pressure for the rear wheels is reduced while maintaining or increasing the brake fluid pressure for the front wheels, and generating by regenerative braking a braking force corresponding to the reduced portion enables recovery of energy by regenerative braking to be carried out effectively without decreasing the total braking force for the vehicle.

In the above-mentioned embodiment, an example in which the brake fluid pressure for the rear wheels connected to the motor/generator is reduced while maintaining the brake fluid pressure for the front wheels is explained, but in contrast thereto it is also possible to reduce the brake fluid pressure for front wheels connected to a motor/generator while maintaining the brake fluid pressure for rear wheels, or reduce the brake fluid pressure for front wheels and rear wheels both connected to a motor/generator. If front wheels and rear wheels are both connected to a motor/generator, the efficiency of recovering energy by regenerative braking can be enhanced.

A mode for carrying out the present invention is explained above, but the present invention may be modified in a variety of ways as long as the modifications do not depart from the gist thereof.

For example, in the embodiment the brake fluid pressure generated by the slave cylinder 23 is nonuniformly distributed between the rear wheel system and the front wheel system, but in a brake device having no slave cylinder 23, a brake fluid pressure generated by a master cylinder or a hydraulic booster may be nonuniformly distributed between a rear wheel system and a front wheel system.

Furthermore, when a brake fluid pressure is generated by a master cylinder, the drive source therefor is a depressing force from a driver.

Figure 5:
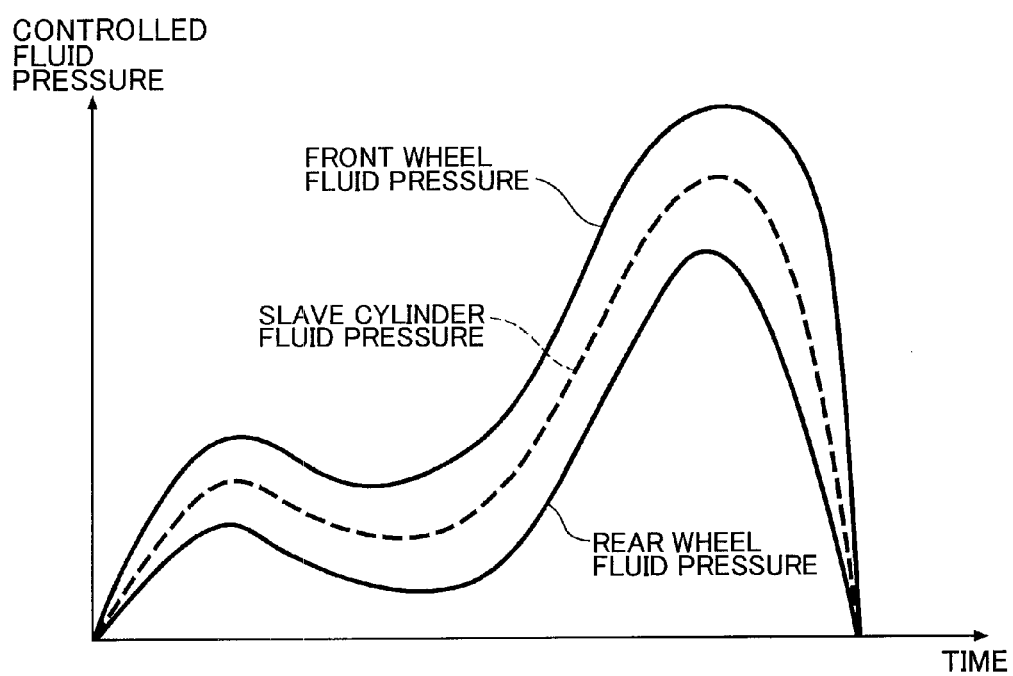
FIG. 5 is a diagram showing change in brake fluid pressure of the front wheel system and the rear wheel system at a time of regenerative braking.

Moreover, in the embodiment the rear wheels are subjected to regenerative braking, but front wheels may be subjected to regenerative braking That is, the 'front wheel' of the embodiment may be replaced by 'rear wheel', or both front wheels and rear wheels may be subjected to regenerative braking, thus achieving the same operational effects. In such cases, while taking into consideration difference in output of the motor/generator between front and rear wheels, the operational state of the motor/generator, distribution of braking force between front and rear wheels, etc., the brake fluid pressure to be generated by the slave cylinder 23 is freely determined as described above, the electric motor 32 of the slave cylinder 23 is controlled so as to generate this brake fluid pressure, and the pressure difference between the brake fluid pressure for the front wheels and the brake fluid pressure for the rear wheels is adjusted by driving the first and second pumps 64A and 64B. In this process, since the front wheels are connected to the motor/generator and can be regeneratively braked, as shown in FIG. 5 the front wheel brake fluid pressure and the rear wheel brake fluid pressure take a vertically symmetrical shape on either side of the brake fluid pressure of the slave cylinder 23.

The invention claimed is:
1. A vehicle brake device in which a first piston that is operated directly by a drive source and a second piston that is a free piston operated indirectly in response to operation of the first piston are disposed in tandem within a cylinder main body, a first fluid pressure chamber formed between the first piston and the second piston is connected to first wheel cylinders of front-side left and right wheels or rear-side left and right wheels, and a second fluid pressure chamber formed between the second piston and the cylinder main body is connected to second wheel cylinders of left and right wheels on a side different from the first wheel cylinders, wherein the vehicle brake device comprises:
a first pump supplying brake fluid of the first fluid pressure chamber to the first wheel cylinders; and
a second pump supplying brake fluid of the second fluid pressure chamber to the second wheel cylinders;
a first electromagnetic valve controlling the state of communication between a suction side of the first pump and the first fluid pressure chamber;
a second electromagnetic valve controlling the state of communication between a discharge side of the first pump and the first fluid pressure chamber;
a third electromagnetic valve controlling the state of communication between a suction side of the second pump and the second fluid pressure chamber; and
a fourth electromagnetic valve controlling the state of communication between a discharge side of the second pump and the second fluid pressure chamber,
wherein the second electromagnetic valve and the fourth electromagnetic valve have a variable degree of opening.

2. The vehicle brake device according to claim 1, wherein the front wheels or the rear wheels are connected to a motor/generator.

3. The vehicle brake device in which a first piston that is operated directly by a drive source and a second piston that is a free piston operated indirectly in response to operation of the first piston are disposed in tandem within a cylinder main body, a first fluid pressure chamber formed between the first piston and the second piston is connected to first wheel cylinders of front-side left and right wheels or rear-side left and right wheels, and a second fluid pressure chamber formed between the second piston and the cylinder main body is connected to second wheel cylinders of left and right wheels on a side different from the first wheel cylinders,
wherein the vehicle brake device comprises: a first pump supplying brake fluid of the first fluid pressure chamber to the first wheel cylinders; and a second pump supplying brake fluid of the second fluid pressure chamber to the second wheel cylinders, and
wherein the front wheels and the rear wheels are connected to a motor/generator.

4. A method for controlling a vehicle brake device in which a first piston that is operated directly by a drive source and a second piston that is a free piston operated indirectly in response to operation of the first piston are disposed in tandem within a cylinder main body, a first fluid pressure chamber formed between the first piston and the second piston is connected to first wheel cylinders of front side left and right wheels or rear side left and right wheels, and a second fluid pressure chamber formed between the second piston and the cylinder main body is connected to second wheel cylinders of left and right wheels on a side different from the first wheel cylinders,
the vehicle brake device comprising control means for controlling the drive source, a first pump supplying brake fluid of the first fluid pressure chamber to the first wheel cylinders and a second pump supplying brake fluid of the second fluid pressure chamber to the second wheel cylinders,
wherein the method comprises:
a step of determining a brake fluid pressure that is to be generated in the first wheel cylinders and the second wheel cylinders;
a step of driving the drive source by determining the amount that the drive source is to be operated based on the brake fluid pressure; and
a step of generating a pressure difference between the first fluid pressure chamber and the second fluid pressure chamber by driving the first pump or the second pump.

5. The method according to claim 4, wherein
the vehicle brake device further comprises a first electromagnetic valve controlling the state of communication between a suction side of the first pump and the first fluid pressure chamber, a second electromagnetic valve controlling the state of communication between a discharge side of the first pump and the first fluid pressure chamber, a third electromagnetic valve controlling the state of communication between a suction side of the second pump and the second fluid pressure chamber, and a fourth electromagnetic valve controlling the state of communication between a discharge side of the second pump and the second fluid pressure chamber, and
the second electromagnetic valve and the fourth electromagnetic valve have a variable degree of opening.

6. The method according to claim 4, wherein the front wheels and the rear wheels are connected to a motor/generator.

* * * * *